United States Patent Office 3,666,425
Patented May 30, 1972

3,666,425
METHOD OF DECANNING NUCLEAR FUEL ELEMENTS HAVING A CAN OF STAINLESS STEEL
Joseph-Gerard Wurm, Varese, and Maurice Payrissat, Ispra, Italy, assignors to European Atomic Energy Community (Euratom), Brussels, Belgium
Filed Sept. 30, 1968, Ser. No. 763,519
Claims priority, application Belgium, Oct. 31, 1967, 50,315
Int. Cl. C22b 61/04
U.S. Cl. 23—324
4 Claims

ABSTRACT OF THE DISCLOSURE

A method of removing stainless steel cans from nuclear fuel elements by using a molten metal solvent of antimony and copper (and optionally a small amount of manganese) at a temperature of about 900° C.

---

This invention relates to a method of decanning nuclear fuel elements having a can of stainless steel, nickel-chromium-iron alloy or nickel-chromium.

The methods used hitherto involve mechanical machining, chemical action, electrochemical action or treatment with liquid metals.

Fresh problems are raised in the decanning of the fuel elements of fast-neutron reactors and the present invention is especially, but not exclusively concerned with fuel elements of fast reactors. Even if mechanical decanning is satisfactory for conventional fuels, the same does not apply to fast nuclear fuels. The large number of needles per element, their small diameter, the high degree of activity and heat liberated, the fission gases under pressure and the possible presence of sodium (either as bonding within the can or as sodium attached to the outside of the element), caesium and iodine make the construction of a mechanical decanner extremely complicated. Together with the question of remote control, a very complicated machine results. Other possible methods of decanning also have serious disadvantages, particularly when applied to fuel elements of fast reactors.

Decanning by dissolving in liquid metals has many advantages because of the simplicity of its implementation and the present invention is concerned with this method. For this method to be economic, however, the ratio of the quantity of stainless steel or other canning material dissolved to the quantity of metallic solvent must approach 0.5.

The canning materials used or being studied for the cans of the fuel elements of fast-neutron nuclear reactors comprise the following types of alloy:

(1) Austenitic stainless steels derived from the standard AISI 316, which have quite a low yield strength, average creep resistance and high ductility.

(2) Nickel alloys with hardening by solid solution of the type Hastelloy X, which are stronger than 316 steels but a little less ductile.

(3) Nickel alloys of the type 80 Ni-20 Cr with structural hardening, whose high mechanical strength makes up for the low ductility.

The problem set and to be solved by this invention is therefore to find a metallic solvent with a high dissolving power at a reasonable temperature, i.e. 800–900° C., for dissolving cans made of the alloys mentioned above. This desired metallic solvent must satisfy a number of technical and economic criteria as listed below:

Dissolving of the canning alloy in the metallic solvent up to a proportion of at least 30% by weight or more.

Dissolving temperature below 1000° C. for practical furnace-construction reasons.

Short dissolving time with a minimum of agitation.

Selective dissolving of the can with respect to the fuel (since treatment or a reaction with $UO_2$ or $PuO_2$ is unacceptable because of the losses involved).

Lowest possible melting point of the metallic solvent for easy separation of the fuel.

The metallic solvent must not contain components that are volatile at 1000° C.

High degree of fluidity of the solvent alloy.

Density (specific gravity) of solvent alloy below 8 for satisfactory decanning of fuel, whose density is generally about 10.

Metallic solvent insensitive to atmospheric corrosion and sea water to facilitate storage of radioactive waste.

Reasonable cost of components of metallic solvent below one dollar per kg.

This invention consists in a method of decanning nuclear fuel elements having cans of stainless steel, nickel-chromium-iron alloy or nickel-chromium alloy, according to which these canning materials are treated with a molten metallic solvent composed mainly of antimony and copper.

Preferred features, which may be used separately or in combination are that the method is effected at temperatures from 750° to 1000° C, the metallic solvent is composed of 95 to 65% by weight of antimony and 5 to 35% by weight of copper, 2 to 10% by weight of manganese is added to the metallic solvent as a deoxidizing agent and to increase the dissolving rate, and the bath of the molten metallic solvent is covered with a layer of molten salts composed of a mixture of salts containing at least one halide whose free energy of formation is much less than that of NaCl or CsCl.

The method may be used as an initial step in a method for the re-treatment of fast irradiated fuels, both for the dry method and for the aqueous method.

The method utilizes a system or apparatus composed of a double crucible of graphite, the inner graphite crucible being placed in the outer crucible with a clearance of a few millimetres between the walls, the inner crucible having a communication hole at a determined height so that the level of the solvent alloy may be the same in both crucibles, the inner crucible being composed of upper and lower members screwed one on to the other, the threading of the detachable lower member being just below the communication hole in the wall of the inner crucible.

A description of some specific embodiments of the method according to the invention will now be given by way of example.

Pieces of stainless steel of the austenitic type NS 22 S (composition: C, 0.025; Si, 0.44; Mn, 1.33; Ni, 9.79; Cr, 18.14; remainder Fe) were placed in metallic solvents of antimony-copper composition with or without the addition of manganese, as well as in other solvents for comparison, and the quantity of stainless steel dissolved in the metallic solvent in an inert atmosphere was measured, the composition of the metallic solvent, the temperature and the time of contact between the stainless steel and metallic solvent being varied. The results shown in Table I were obtained.

TABLE I.—SOLUTION WITH STAINLESS STEEL

| Metallic solvent | Temperature in ° C. | Dissolving time in minutes | Percentage of stainless steel dissolving, in grams percent |
|---|---|---|---|
| Sb, 76.5%; Cu, 23.5%. | 850 | 8 | 13.8 |
| | | 18 | 20 |
| | | 36 | 30.7 |
| | | 64 | 31.7 |
| Sb, 76.5%; Cu, 23.5%. | 900 | 8 | 29.3 |
| | | 18 | 32.7 |
| | | 31 | 34.5 |
| | | 46 | 36.5 |
| Sb, 76.5%; Cu, 23.5%. | 1,000 | 2 | 16.8 |
| | | 6 | 30 |
| | | 14 | 38 |
| | | 24 | 40 |
| Sb, 85%; Cu, 15%. | 850 | 4 | 8 |
| | | 8 | 21.8 |
| | | 20 | 28.2 |
| | | 30 | 30.2 |
| | | 60 | 33.6 |
| Sb, 85%; Cu, 15%. | 900 | 2 | 17.2 |
| | | 5 | 31 |
| | | 10 | 33.4 |
| | | 20 | 36.8 |
| | | 30 | 36.8 |
| Sb, 85%; Cu, 15%. | 1,000 | 4 | 32.5 |
| | | 7 | 40.2 |
| | | 20 | 49 |
| | | 35 | 54.8 |
| | | 53 | 57.2 |
| Sb, 90%; Cu, 10%. | 850 | 4 | 20 |
| | | 8 | 29.8 |
| | | 14 | 32.4 |
| | | 18 | 38 |
| | | 24 | 38 |
| Sb, 90%; Cu, 10%. | 900 | 2 | 26.2 |
| | | 6 | 37 |
| | | 10 | 42 |
| | | 18 | 42 |
| Sb, 90%; Cu, 10%. | 1,000 | 2 | 31.1 |
| | | 4 | 42.1 |
| | | 14 | 48.6 |
| | | 15 | 56.6 |
| | | 22 | 60.6 |
| | | 32 | 61.4 |
| Sb, 95%; Cu, 5%. | 850 | 4 | 5.6 |
| | | 10 | 14.4 |
| | | 15 | 15.2 |
| | | 25 | 27 |
| | | 30 | 40 |
| Sb | 850 | 4 | 18.4 |
| | | 12 | 23.2 |
| | | 22 | 29.8 |
| | | 42 | 40.6 |
| Sb, 75.3; Cu, 16.3; Mn, 8.4. | 850 | 4 | 22 |
| | | 9 | 24.4 |
| | | 19 | 24.8 |
| | | 49 | 26 |
| Sb, 75.3; C, 16.3; Mn, 8.4. | 900 | 2 | 21.7 |
| | | 6 | 29.1 |
| | | 26 | 33.6 |
| | | 66 | 35.5 |
| Cu, 33; Al, 67. | 850 | 4 | 6 |
| | | 46 | 7 (¹) |
| Zn | 800 | | (²) |

¹ Saturation.
² Very low degree of solution, pronounced evaporation of zinc.

APPROXIMATE RESULTS FOR PURE NICKEL

| | | | |
|---|---|---|---|
| Sb, 95%; Cu, 5%. | 850 | | 24 (¹) |
| Sb, 90%; Cu, 5%. | 850 | | 32 (¹) |
| Sb, 75.5; Cu, 23.5. | 850 | | 48 (¹) |

¹ Saturation.

NOTE: Owing to the experimental difficulties involved in measuring the temperature of the metallic solvent exactly, the values of Table I are regarded as average values of several experiments and represent rather an order of magnitude.

Figure 1A:
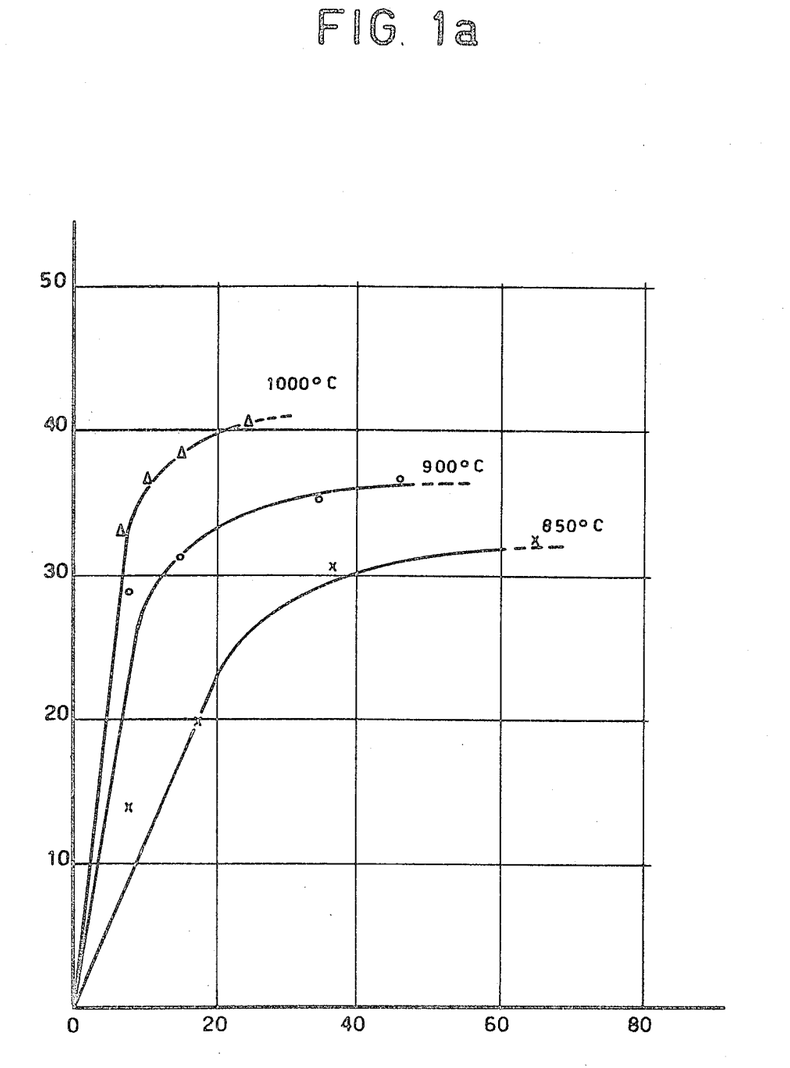
Figure 1B:
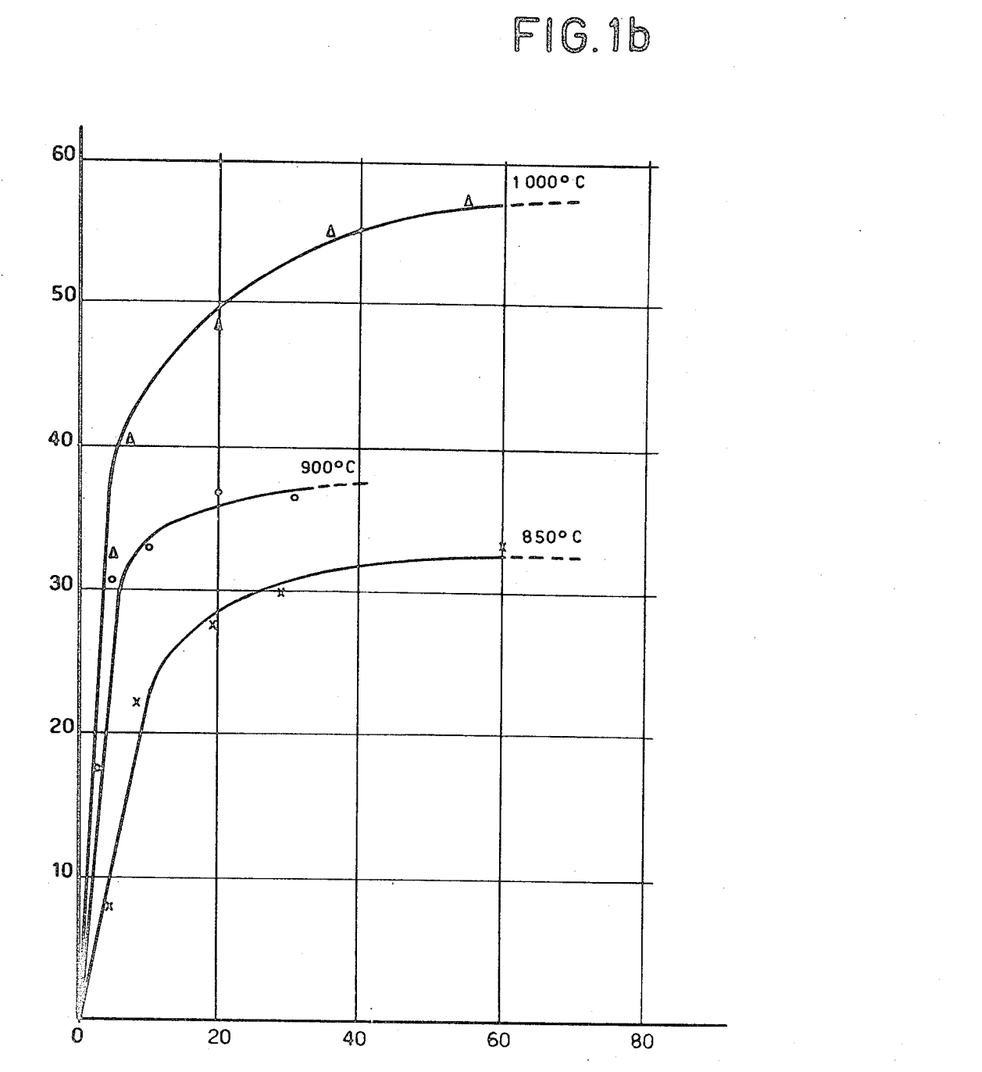
Figure 1C:
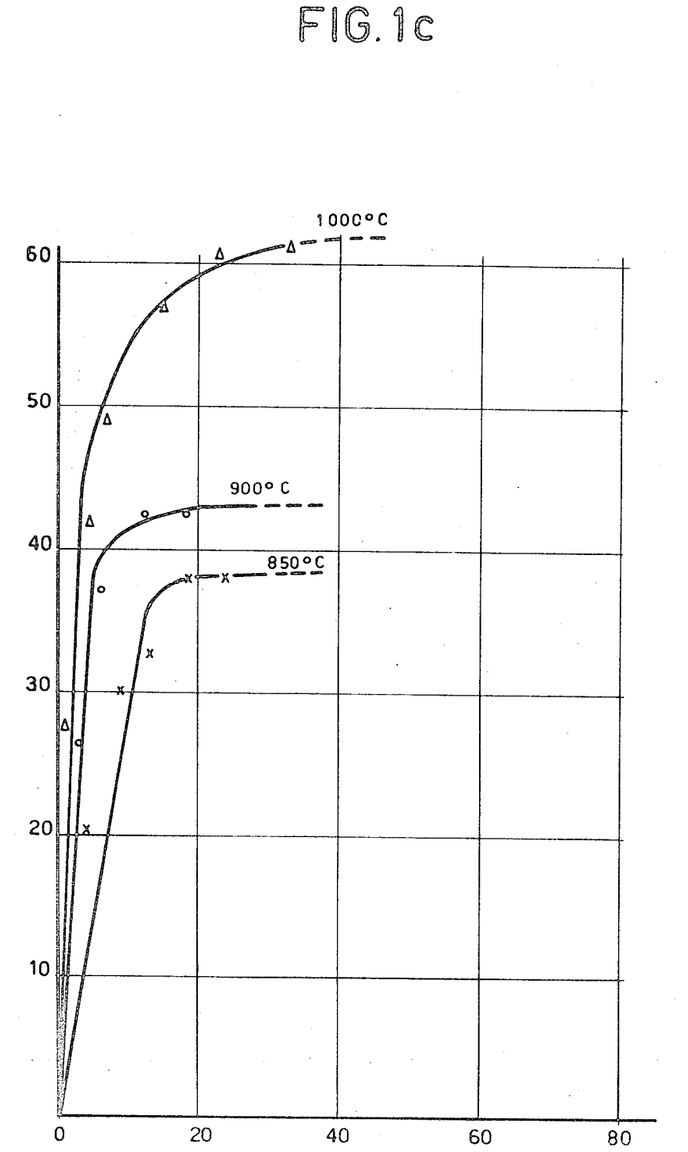
Figure 2:
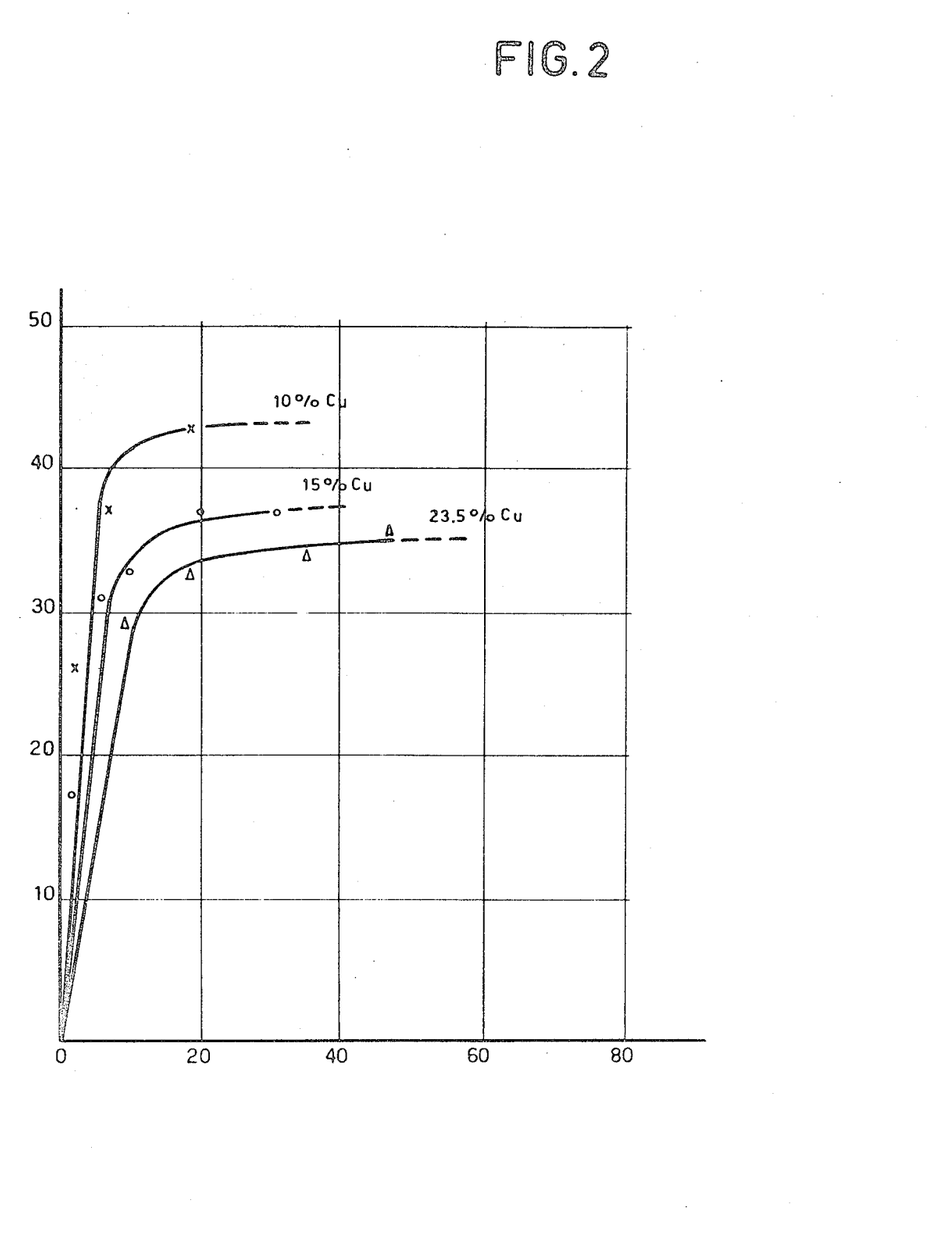
Figure 3:
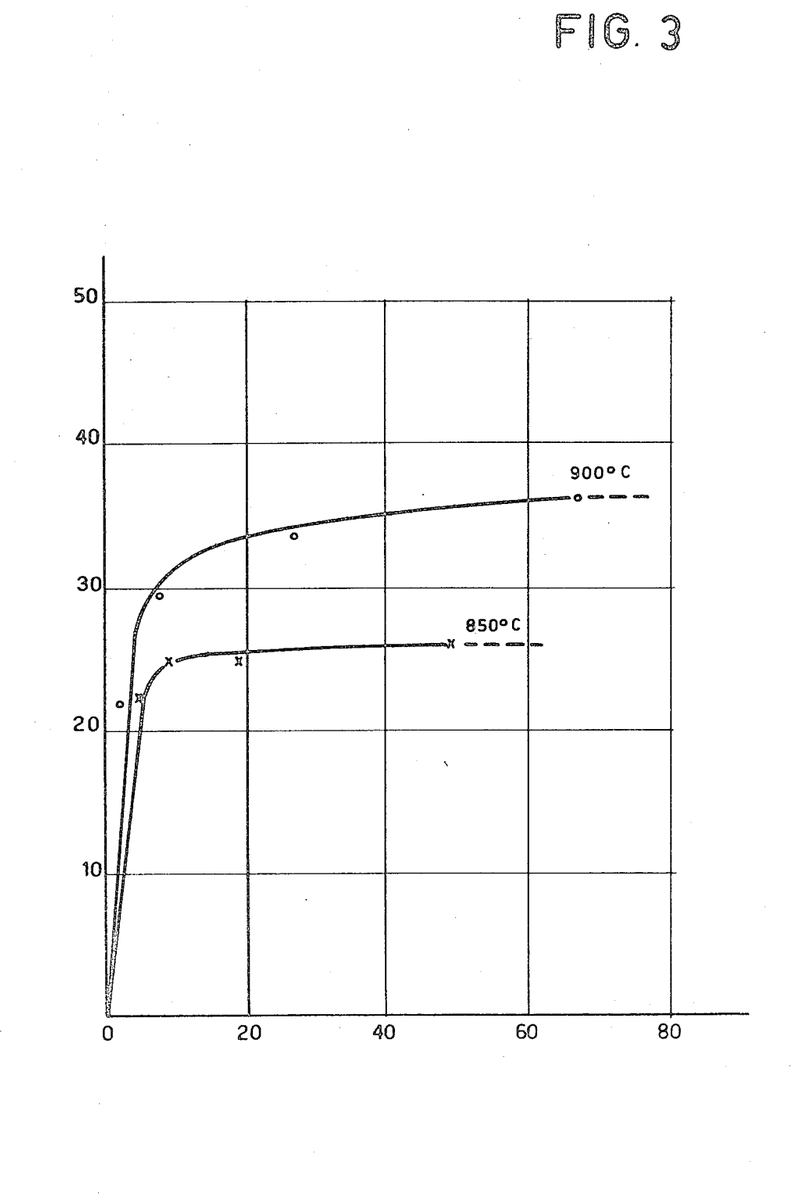

For a discussion of the results, FIGS. 1 to 3 are adopted as a basis. FIG. 1 shows the effect of the percentage of copper at 800° C. on the dissolving rate and the dissolving capacity of the metallic solvent. FIG. 2 shows the effect of the temperature on the dissolving rate and the dissolving capacity of a metallic solvent of the composition Sb, 76.5 g. and Cu, 23.5 g. percent, and FIG. 3 shows the effect of the temperature on the dissolving rate and the dissolving capacity of a metallic solvent of the composition Sb, 75.3 g. percent, Cu, 16.3 g. percent and Mn, 8.4 g. percent.

The solution curves for solvents of different composition show in FIGS. 1a, 1b and 1c that the best dissolving performance is obtained with Sb-Cu 10 g. percent, with 43% solution after 20 minutes at 900° C. As Table I shows, Sb-Cu 5 g. percent, on the other hand, and Sb alone are distinctly less advantageous. It appears that the optimum composition at 800° C. is between 10 and 15 g. percent of copper. The metallic solvent Sb-Cu 10 g. percent also has a very good fluidity even after saturation. The shrinkage of the ingot is better with Cu. Metallographic examination and the microprobe show that the saturated alloy is relatively homogeneous. Even with a greater degree of solution at 1000° C. there is no precipitation of the stainless steel on cooling. It is also found that the copper serves among other things for the solubilization of the nickel.

FIGS. 1a, 1b and 1c show that the rate of solution of the stainless steel depends to a large extent on the temperature. At 850° C., the slope of the curve is still slight (FIG. 1a); it takes nearly 60 minutes for 32 g. percent to be dissolved. But at 900° C. the solution kinetics are good. The curve (FIG. 1a) moves towards saturation at 36% after 50 minutes of solution. At 1000° C. the slope of the curve approaches the vertical. After 8 minutes a solution of 34 g. percent is obtained. Saturation is reached after 30 minutes at 41 g. percent. For this liquid alloy Sb-Cu 23.5 g. percent Cu the dissolving temperature of 900° C. would be a good compromise.

FIGS. 1b and 1c show a distinct improvement in the solution kinetics according to the amount of copper added. To take the most favourable example, FIG. 1c, solution of 42 g. percent at 900° C. may be obtained in 15 minutes and practically 60 g. percent in 20 minutes at 1000° C. FIG. 2 enables the dissolving capacity of three different compositions of the metallic solvent at a temperature of 900° C. to be compared. These three curves are taken from FIGS. 1a, 1b and 1c at 900° C. in each case.

The curves in FIG. 3 show the effect of adding manganese to the metallic solvent Sb, 75.3 g. percent, Cu, 16.3 g. percent and Mn, 8.4 g. percent. The addition of manganese increases the fluidity of the metallic solvent and its dissolving rate between 700 and 800° C. and also acts as a deoxidizing agent facilitating the action on the surface of the stainless steel.

A metallic solvent of the composition Cu 33 g. percent-Al 67 g. percent at 800° C. is not advantageous. Saturation is already reached with 6% of stainless steel. This solution of the problem was eliminated, as was the one derived from the ternary alloy Al-Cu-Mn.

Experience with liquid zinc shows that the solution of stainless steel in the latter is too low at 750° C. to produce an economically advantageous solution of the problem. In addition, considerable evaporation of the zinc takes place at this temperature, necessitating operation under pressure.

For the problem set, the decanning of fuel elements having cans of stainless steel, a solvent of the composition Sb-Cu (10 to 15 g. percent) is the most appropriate at a temperature of about 850–900° C. This gives a solution rate of 38 to 43 g. percent by weight in 15 to 30 minutes with constant agitation. Similar results are obtained with the other types of stainless steel whose composition is very similar.

When the steels to be dissolved contain a great deal of nickel, or when nickel-chromium or nickel-chromium-iron alloys (e.g. of the kind known under the trademark Hastelloy) are to be dissolved, an increase in the concentration of copper in the metallic solvent is beneficial, so that the metallic solvent Sb-Cu (23.5–30% of Cu) would be best in this case.

Figure 4:
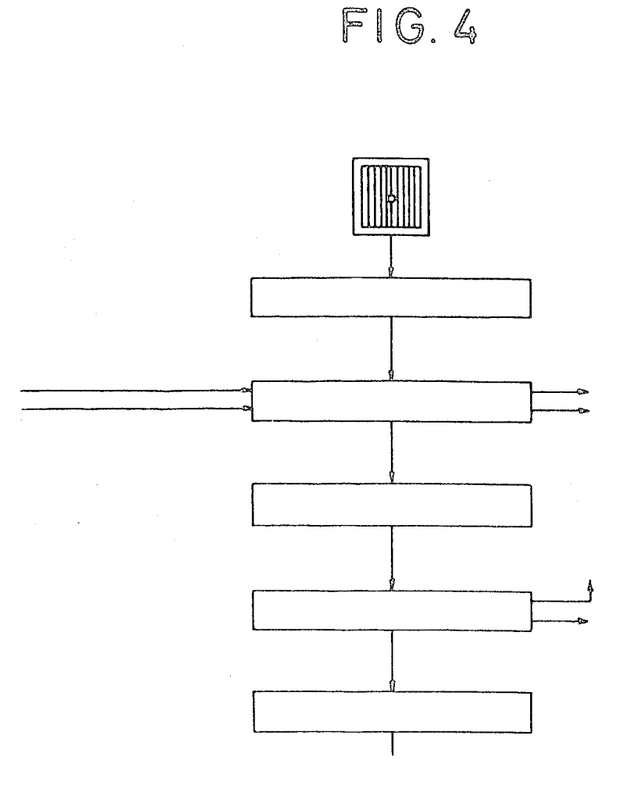

According to FIG. 4, the method of dissolving stainless steels as a preliminary step of a method for the retreatment of fast fuels may be used. The fuel elements have come from the fast reactor, and are stored for cooling in Na, for example for 100 days. The stainless-steel can is then dissolved with fresh solvent alloy, covered with a molten salt for the halide slagging of the metallic sodium with another halide decomposable by metallic sodium, such as chloride of lead or zinc preferably a mixture with potassium chloride. The metallic sodium in question is contained in the fuel element as a heat-carrying agent during the operation of the reactor, or attached to the outside of the element.

The layer of molten salt on the metallic solvent also acts as a protective flux on the surface and as a heat-carrying medium for eliminating the heat liberated by the can from the metallic solvent. It also serves for slagging the sodium, and retaining the Cs and, partly, the iodine combined in the form of iodide.

After the stainless steel of the can has been dissolved, the fuel is sedimented, and the molten salt, the metallic solvent with the dissolved steel and the solid waste are separated to obtain the concentrated fuel (already slightly purified of fission products), mixed with a negligible quantity of metallic solvent. This mass may be introduced directly in an aqueous or dry retreatment process, for example fluoridation or a pyrometallurgical process.

For a prototype fuel element having a length of about 250 cm., the quantity of stainless steel to be dissolved including the hexagonal can or cladding and support grids amounts to about 50 kg. by weight or a volume of 6.5 litres. Dissolving this quantity requires 150 kg. of metallic solvent or a volume of 20 litres. After the dissolving operation, the metallic solvent, fuel and stainless steel take up a volume of 30 litres.

For satisfactory settling of the decanned fuel in the metallic solvent, the most suitable geometrical shape of the furnace is that of an elongated cylinder whose inside diameter exceeds by a few centimetres the diameter of the fuel element to be introduced. The fuel element hung from the powered remote handler should be dipped gradually in the metallic solvent while rotating about its vertical axis (speed of rotation: 60 r.p.m.). This gradual solution is preferable to total immersion of the element in the metallic solvent, which would demand a larger amount of the latter and which would therefore not be saturated with stainless steel at the end of the operation; it is also preferable for economic reasons. Nevertheless, saturation beyond 40 g. percent of stainless steel in the metallic solvent is not advisable for facilitating the solvent-fuel separation. To dissolve a given quantity of stainless steel, the quantity of metallic solvent should therefore be adjusted so as not to exceed this concentration of 40 g. percent. To accelerate solution, however, a higher temperature, amounting to as much as 1000° C., may be used, a lower temperature (850–900° C.) being used in the separation of the solvent and fuel. With gradual solution, the ratio of metallic solvent to stainless steel may be adjusted more easily in order to obtain practically complete saturation. The saturated alloy is then stored immediately as solid waste recoverable after an adequate decay time.

The system or apparatus according to the invention for carrying out the method as described above is shown in FIGS. 5, 6 and 7.

Figures 5, 6, 7:
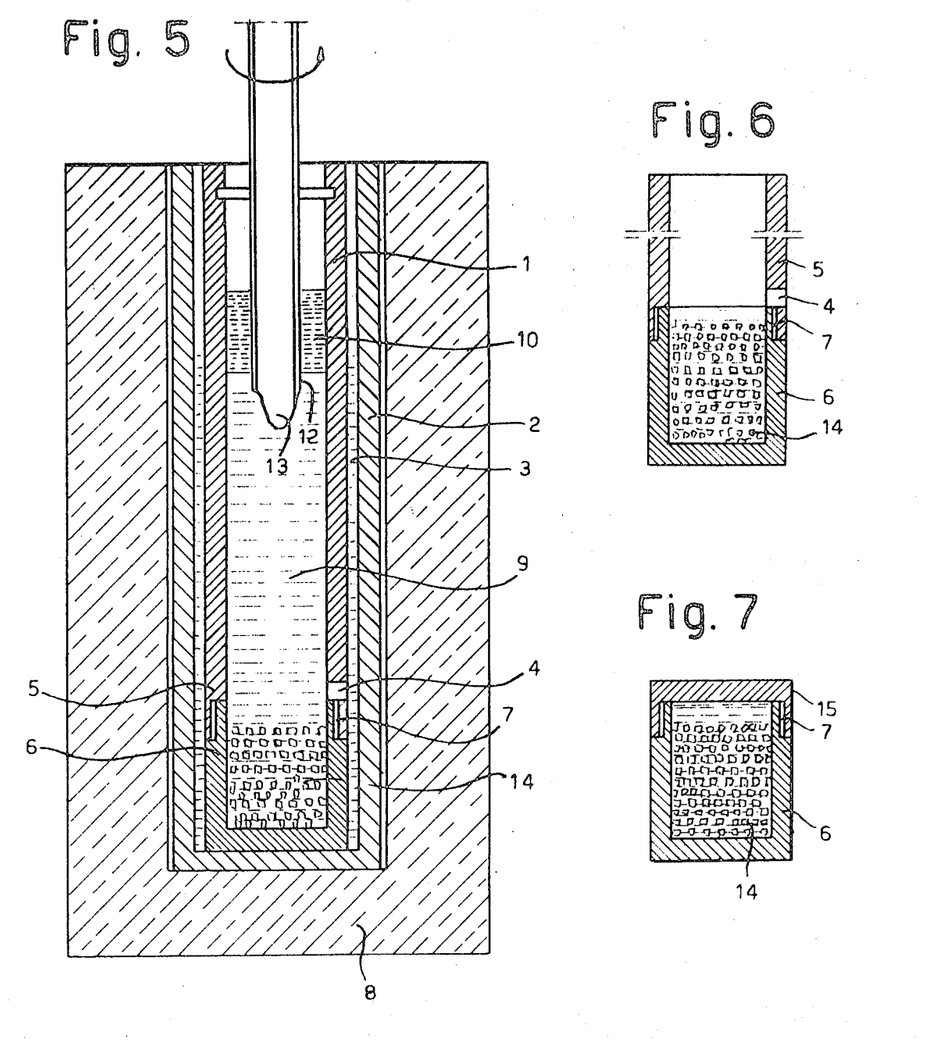

FIG. 5 is a longitudinal section through a crucible and furnace, and FIGS. 6 and 7 show the possibilities offered by the detachable bottom of the crucible.

The system (see FIG. 5) comprises a double crucible made of graphite, the inner crucible 1 being received in the outer crucible 2 with a clearance 3 of a few millimetres between their walls, the inner crucible having a communication hole 4 so that the level of the metallic solvent is the same in both crucibles. The inner crucible comprises two members, an upper member 5 screwed on to a lower member 6, the threading 7 of the detachable bottom (or lower member) 6 being just below the communication hole 4 in the wall of the inner crucible 1. The two crucibles rest in a furnace 8, which may be of the resistance or induction type.

During operation, the system contains the metallic solvent 9 covered by a layer of molten salts 10, the fuel element 11 to be decanned is immersed from the top in the solvent, the can 12 dissolves, the fuel 13 is released and accumulates at the bottom of the inner crucible 14. When the operation is complete, the inner crucible is withdrawn slowly, and the layer of molten salt and the metallic solvent floating on the sedimented fuel pass through the communication hole 4 into the outer crucible 2. This results in the situation illustrated in FIG. 6: only the detachable lower part 6 is filled with fuel 14; the upper part 5 is unscrewed off the detachable lower part 6 and the lower part is left to cool. This is followed by closure with with a graphite cover 15 as shown in FIG. 7.

The fuel, thus concentrated in a small space, is sent just as it is in its graphite packing to a retreatment station. If the separation of metallic solvent-fuel+salt is not complete, it is desirable to do so. It is preferable to carry out complete filtration at the works just before retreatment. The decanned and concentrated fuel in any case necessitates cooling during transport. The metallic solvent then accompanying the fuel will act as a heat-carrying agent and promote the elimination of the heat in the transport container.

The metallic solvent in the outer crucible is finally poured into moulds to form rods, and then stored as low-activity solid waste. After a few years of deactivation the antimony may be recovered by simple distillation. The layer of molten salt covering the metallic solvent may be used several times; it is then eliminated as solid waste after saturation with Na, Cs and I.

The above description relates particularly to a ceramic fuel of high density, which sediments correctly in the metallic solvent.

If the method and system are to be used for the treatment of a ceramic fuel of lower density in which the sedimentation conditions are not satisfied, i.e. in which a suspension of the fuel forms in the metallic solvent, the system as described may be used, but without a communication hole in the inner crucible, and when decanning is complete practically all the metal and a high proportion of the floating salt may be removed by means of a suction tube made of graphite and having a filtering means at its bottom end.

Suction will be stopped when the level of the salt falls below the threading, enabling the two parts of the inner crucible to be separated. The fuel material will thus be embedded in the salt bath, which will act as a heat-carrying agent during transport.

The advantages of the invention (method and system) may be summarized as follows:

The method may be carried out with very compact equipment alongside a reactor. The rate of solution of the stainless steel is extremely advantageous; this also affects the cost. Volatile fission products are eliminated, together with the heat-carrying sodium and part of the Cs and iodine, and the fuel is concentrated at the same time in a small space in its graphite packing. This greatly simplifies the production of transport containers and therefore reduces transport costs. The transport of fuel largely free from gaseous fission products is more in accord with safety requirements. The solution of the fuel in the retreatment works is considerably simplified.

We claim:

1. A method of decanning a nuclear fuel element having a can of a metal selected from the group consisting of stainless steel, nickel-chromium-iron alloy or nickel-chromium alloy comprising dissolving the canning material with a molten metallic solvent containing 95% to 65% by weight of antimony and 5% to 35% by weight of copper at a temperature between 700 and 1000° C.

2. A method as claimed in claim 1 in which the composition is 10 to 15% copper and 90 to 85% antimony and the temperature is 850 to 900° C.

3. A method as claimed in claim 1 in which 2 to 8% by weight of manganese is added to the metallic solvent.

4. A method as claimed in claim 1 in which the molten metallic solvent is covered with a layer of molten salts consisting essentially of a chloride selected from the group consisting of lead and zinc chloride or mixtures thereof.

References Cited

UNITED STATES PATENTS

| | | | |
|---|---|---|---|
| 3,102,849 | 9/1963 | Van der Wall et al. | 23—324 |
| 3,120,435 | 2/1964 | Chiotti | 23—325 |
| 3,282,681 | 11/1966 | Knighton et al. | 23—325 |
| 3,284,190 | 11/1966 | Knighton et al. | 23—325 |

FOREIGN PATENTS

| | | | |
|---|---|---|---|
| 1,438,507 | 3/1965 | France | 23—324 |

OTHER REFERENCES

Metals Handbook, 8th ed., vol. 1, pg. 268, published by American Society for Metals, 1964.

Reactor Fuel Processing, vol. 7, No. 3, pg. 190, 1964.

Reactor Fuel Processing, vol. 3, No. 2, pg. 27, April 1960.

CARL D. QUARFORTH, Primary Examiner

F. M. GITTES, Assistant Examiner

U.S. Cl. X.R.

23—325, 342; 134—2; 252—301.1; 75—65